United States Patent
Allyn et al.

(10) Patent No.: US 10,304,225 B2
(45) Date of Patent: May 28, 2019

(54) CHART-TYPE AGNOSTIC SCENE GRAPH FOR DEFINING A CHART

(71) Applicant: Microsoft Technology Licensing, LLC, Redmond, WA (US)

(72) Inventors: Barry Christopher Allyn, Snohomish, WA (US); Qijin Zhou, Bellevue, WA (US); Kurt William Berglund, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/395,871

(22) Filed: Dec. 30, 2016

(65) Prior Publication Data
US 2018/0189988 A1 Jul. 5, 2018

(51) Int. Cl.
*G06T 11/20* (2006.01)

(52) U.S. Cl.
CPC ........ *G06T 11/206* (2013.01); *G06T 2200/16* (2013.01)

(58) Field of Classification Search
None
See application file for complete search history.

(56) References Cited

U.S. PATENT DOCUMENTS

| | | | |
|---|---|---|---|
| 5,953,506 A * | 9/1999 | Kalra | G06T 3/4092 345/428 |
| 6,272,231 B1 | 8/2001 | Maurer et al. | |
| 6,301,579 B1 | 10/2001 | Becker | |
| 7,561,159 B2 | 7/2009 | Abel et al. | |
| 7,584,415 B2 | 9/2009 | Cory et al. | |
| 7,737,979 B2 | 6/2010 | Robertson et al. | |
| 8,531,484 B2 | 9/2013 | Dong et al. | |
| 8,786,628 B2 | 7/2014 | Rampson et al. | |
| 9,037,964 B2 | 5/2015 | Appleyard et al. | |
| 9,129,158 B1 | 9/2015 | Medasani et al. | |
| 9,135,228 B2 | 9/2015 | Jakobson et al. | |
| 9,213,554 B2 | 12/2015 | Kumar et al. | |
| 9,250,926 B2 | 2/2016 | Allyn et al. | |
| 9,378,582 B2 | 6/2016 | Slavin, III et al. | |
| 10,002,115 B1 | 6/2018 | Killian et al. | |
| 2003/0011637 A1* | 1/2003 | Boudier | G06T 17/005 715/771 |

(Continued)

OTHER PUBLICATIONS

Tobler, Separating Semantics from Rendering: A Scene Graph Based Architecture for Graphics Applications, 2011, The Visual Computer, vol. 27, pp. 687-695.*

(Continued)

*Primary Examiner* — Anh-Tuan V Nguyen
(74) *Attorney, Agent, or Firm* — Merchant & Gould

(57) ABSTRACT

Generating a chart-type agnostic data structure for defining a chart for use in chart rendering, animation, interactivity, and accessibility via a web client is provided. Aspects of a charting system are operative to represent output of a server-side chart layout engine in a data structure that can transmitted to and consumed by the web client for rendering an interactive chart. For example, aspects of the charting system enable for chart layout and chart rendering to exist separately, providing efficient chart layout and preventing external exposure of chart layout code.

20 Claims, 11 Drawing Sheets

(56) References Cited

U.S. PATENT DOCUMENTS

| | | | |
|---|---|---|---|
| 2003/0031260 A1* | 2/2003 | Tabatabai | G06F 17/30569 375/240.25 |
| 2003/0065668 A1 | 4/2003 | Sowizral et al. | |
| 2004/0012594 A1 | 1/2004 | Gauthier et al. | |
| 2006/0031187 A1 | 2/2006 | Pyrce et al. | |
| 2007/0074117 A1 | 3/2007 | Tian et al. | |
| 2007/0238520 A1* | 10/2007 | Kacmarcik | A63F 13/10 463/33 |
| 2008/0195936 A1 | 8/2008 | White et al. | |
| 2009/0066700 A1 | 3/2009 | Harding et al. | |
| 2009/0174717 A1 | 7/2009 | Salisbury et al. | |
| 2009/0278848 A1 | 11/2009 | Robertson et al. | |
| 2009/0327883 A1 | 12/2009 | Robertson et al. | |
| 2010/0013842 A1 | 1/2010 | Green et al. | |
| 2010/0060645 A1 | 3/2010 | Garg et al. | |
| 2010/0079459 A1 | 4/2010 | Breeds et al. | |
| 2010/0122168 A1* | 5/2010 | Silberstein | G11B 27/034 715/719 |
| 2010/0149188 A1 | 6/2010 | Roseborough et al. | |
| 2010/0153544 A1 | 6/2010 | Krassner et al. | |
| 2010/0180213 A1 | 7/2010 | Karageorgos et al. | |
| 2010/0198787 A1 | 8/2010 | Robertson et al. | |
| 2010/0211627 A1 | 8/2010 | Roseborough | |
| 2010/0231595 A1 | 9/2010 | Dang et al. | |
| 2010/0325564 A1 | 12/2010 | Mital et al. | |
| 2011/0035435 A1 | 2/2011 | Meng et al. | |
| 2011/0316884 A1 | 12/2011 | Giambalvo et al. | |
| 2012/0271963 A1 | 10/2012 | Setlur et al. | |
| 2012/0317506 A1 | 12/2012 | Zhao et al. | |
| 2013/0091465 A1 | 4/2013 | Kikin-Gil et al. | |
| 2013/0093764 A1* | 4/2013 | Andersson | G06F 9/4443 345/419 |
| 2013/0120422 A1* | 5/2013 | Rao | G06T 13/00 345/581 |
| 2013/0132840 A1 | 5/2013 | Blas, Jr. et al. | |
| 2013/0144566 A1* | 6/2013 | De Biswas | G06T 17/005 703/1 |
| 2013/0159893 A1* | 6/2013 | Lewin | G06F 9/4443 715/762 |
| 2013/0185624 A1 | 7/2013 | Appleyard et al. | |
| 2013/0204450 A1* | 8/2013 | Kagan | H04L 67/06 700/291 |
| 2013/0249917 A1 | 9/2013 | Fanning et al. | |
| 2014/0085311 A1 | 3/2014 | Gay et al. | |
| 2014/0089865 A1 | 3/2014 | Gay et al. | |
| 2014/0125672 A1 | 5/2014 | Winternitz et al. | |
| 2014/0149836 A1 | 5/2014 | Bedard et al. | |
| 2014/0152667 A1 | 6/2014 | Li et al. | |
| 2014/0168239 A1 | 6/2014 | Elmieh et al. | |
| 2014/0270561 A1 | 9/2014 | Matthews | |
| 2014/0281918 A1 | 9/2014 | Wei et al. | |
| 2014/0325530 A1* | 10/2014 | Lu | G06F 9/542 719/318 |
| 2014/0362086 A1 | 12/2014 | Brockmann et al. | |
| 2014/0380178 A1 | 12/2014 | Kapahi | |
| 2015/0049951 A1 | 2/2015 | Chaturvedi et al. | |
| 2015/0062052 A1 | 3/2015 | Bernstein et al. | |
| 2015/0205840 A1 | 7/2015 | Yerli et al. | |
| 2015/0234557 A1* | 8/2015 | Dorn | G06F 3/0484 715/803 |
| 2015/0295983 A1* | 10/2015 | Hu | H04L 67/02 719/329 |
| 2015/0370763 A1 | 12/2015 | Wang et al. | |
| 2016/0004544 A1 | 1/2016 | Paraschivescu | |
| 2016/0103828 A1 | 4/2016 | Woolf | |
| 2016/0103872 A1 | 4/2016 | Prophete et al. | |
| 2016/0104307 A1 | 4/2016 | Allyn et al. | |
| 2016/0188112 A1 | 6/2016 | Forlines et al. | |
| 2016/0307028 A1 | 10/2016 | Fedorov | |
| 2017/0062009 A1* | 3/2017 | Clifton | G11B 27/034 |
| 2017/0076091 A1* | 3/2017 | Prophete | G06F 21/53 |
| 2017/0124161 A1* | 5/2017 | Wu | G06F 3/0482 |
| 2017/0132814 A1 | 5/2017 | Liu et al. | |
| 2017/0236320 A1 | 8/2017 | Gribetz et al. | |
| 2017/0255884 A1* | 9/2017 | Visvanathan | G06F 17/3056 |

OTHER PUBLICATIONS

Butler, et al., "The GeoJSON Format Specification", http://geojson.org/geojson-spec.html, Published on: Jun. 16, 2008, 7 pages.

"Using Google Charts", http://web.archive.org/web/20130906100733/https://developers.google.com/chart/interactive/docs/, Published on: Sep. 6, 2013, 3 pages.

"Big Data Charts", https://www.zingchart.com/features/big-data-charts/, Retrieved on: Oct. 27, 2016, 5 pages.

"Visualize Data, Together", https://plot.ly/, Retrieved on Oct. 27, 2016, 8 pages.

Diggins, Christopher, "JSON Scene Description Language", http://area.autodesk.com/blogs/the-3ds-max-blog/json-scene-description-language, Feb. 14, 2013, 10 pages.

"SceneJS", http://scenejs.org/, Retrieved on: Oct. 27, 2016, 6 pages.

"Vis.Js", http://visjs.org/, Retrieved on: Oct. 27, 2016, 3 pages.

Latif, Lawrence, "Google allows C and C++ code to run in Chrome web browser", http://www.theinquirer.net/inquirer/news/2101542/google-allows-code-run-chrome-web-browser, Aug. 12, 2011, 1 page.

Sehr, David, "Portable Native Client: The "pinnacle" of speed, security, and portability", https://blog.chromium.org/2013/11/portable-native-client-pinnacle-of.html, Nov. 12, 2013, 3 pages.

Nation, Zach, "3 Steps to Scalable Data Visualization in React.js & D3.js", https://www.codementor.io/reactjs/tutorial/3-steps-scalable-data-visualization-react-js-d3-js, Apr. 30, 2015, 18 pages.

Singhal, Vaibhav, "20 best JavaScript charting libraries", http://thenextweb.com/dd/2015/06/12/20-best-javascript-chart-libraries/#gref, Jun. 12, 2015, 23 pages.

Jeffrey, Ajiri Osauzo, "Chart of the Chrome Pepper Plugin Application", https://www.linkedin.com/pulse/chart-typical-native-client-software-render-ajiri-osauzo, Dec. 8, 2015, 20 pages.

"Using Google Charts", https://developers.google.com/chart/interactive/docs/, May 26, 2015, 2 pages.

"OpenViz", http://www.avs.com/solutions/openviz/, Retrieved Date: Sep. 27, 2016, 3 pages.

"U.S. Appl. No. 15/395,732, Office Action dated Nov. 15, 2017, 27 pgs."

Wikipedia, Title: "HTML5" by , "https://en.wikipedia.org/wiki/HTML5", last edited date: Oct. 21, 2017. https://en.wikipedia.org/wiki/HTML5.

Birtles, Brian, "Animating like you just don't care with Element.animate", https://hacks.mozilla.org/2016/08/animating-like-you-just-dont-care-with-element-animate/, Published on: Aug. 3, 2016, 10 pages.

Maloney, et al., "Directness and Liveness in the Morphic User Interface Construction Environment", In Proceedings of the 8th annual ACM symposium on User interface and software technology, Nov. 14, 1995, pp. 21-28.

U.S. Appl. No. 15/395,732, filed Dec. 30, 2016.
U.S. Appl. No. 15/395,808, filed Dec. 30, 2016.
U.S. Appl. No. 15/395,808, Office Action dated Feb. 22, 2018.

"Final Office Action Issued in U.S. Appl. No. 15/395,732", dated Sep. 13, 2018, 37 Pages.

"Final Office Action Issued in U.S. Appl. No. 15/395,808", dated Aug. 9, 2018, 19 Pages.

"Advisory Action Issued in U.S. Appl. No. 15/395,732", dated Nov. 28, 2018, 6 Pages.

"Non Final Office Action Issued in U.S. Appl. No. 15/395,808", dated Dec. 13, 2018, 21 pages.

"Non Final Office Action Issued in U.S. Appl. No. 15/395,732", dated Apr. 1, 2019, 37 Pages.

"Notice of Allowance Issued in U.S. Appl. No. 15/395,808", dated Apr. 10, 2019, 8 Pages.

* cited by examiner

CHART-TYPE AGNOSTIC SCENE GRAPH FOR DEFINING A CHART

BACKGROUND

Charts are often included in documents to ease understanding of large quantities of data and the relationships between parts of the data. Users are increasingly using web applications for performing tasks, such as for generating or editing documents including charts, and have an increasing expectation for a seamless user experience among desktop and web applications. For example, users expect to manipulate charts in a browser similarly to how they can within a local client application, and further expect a user interface that is responsive.

As can be appreciated, performing layout of a chart via a web client consumes a significant amount of machine resources and decreases computer performance, particularly as the data size grows or as the number of chart features increases. To implement interactive charts in a browser, a data structure is needed to effectively and efficiently capture and communicate the information needed to display, animate, and interact with the chart.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for generating a chart-type agnostic data structure for defining a chart for use in chart rendering, animation, interactivity, and accessibility via a web client. Aspects of a charting system are operative to represent output of a server-side chart layout engine in a data structure that can transmitted to and consumed by a web browser for rendering an interactive chart. For example, aspects of the charting system enable for chart layout and chart rendering to exist separately.

According to an example, when a client requests a chart layout, a chart definition is passed to a chart layout engine. The chart definition may include such information as the type of chart to display, the series of data points that are to be charted, as well as properties on the chart, such as titles, legends, labels, colors, etc. The chart layout engine is operative to translate the chart definition into a layout of the chart, and encode the visual representation of the layout into a scene graph. According to an aspect, the scene graph includes a collection of nodes in a graph or tree data structure that define the chart that enables an endpoint to render the chart.

According to aspects, the data structure is chart-type agnostic, enabling an endpoint to build any type of chart. As additional chart features are introduced, the performance and memory costs of client-side resources are not increased. Further, by enabling chart layout to occur on a server and providing an output of the layout to a web client, the processor load and memory usage of the client computing device is reduced.

In some examples, the scene graph includes custom data that provides mapping back to the input chart description, allowing for the client to animate transitions, implement interactivities, and provide standardized accessibility locally within the web browser. In such scenarios, roundtrips to the server to calculate a next output state to animate to are minimized, thus reducing network bandwidth usage.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1A:
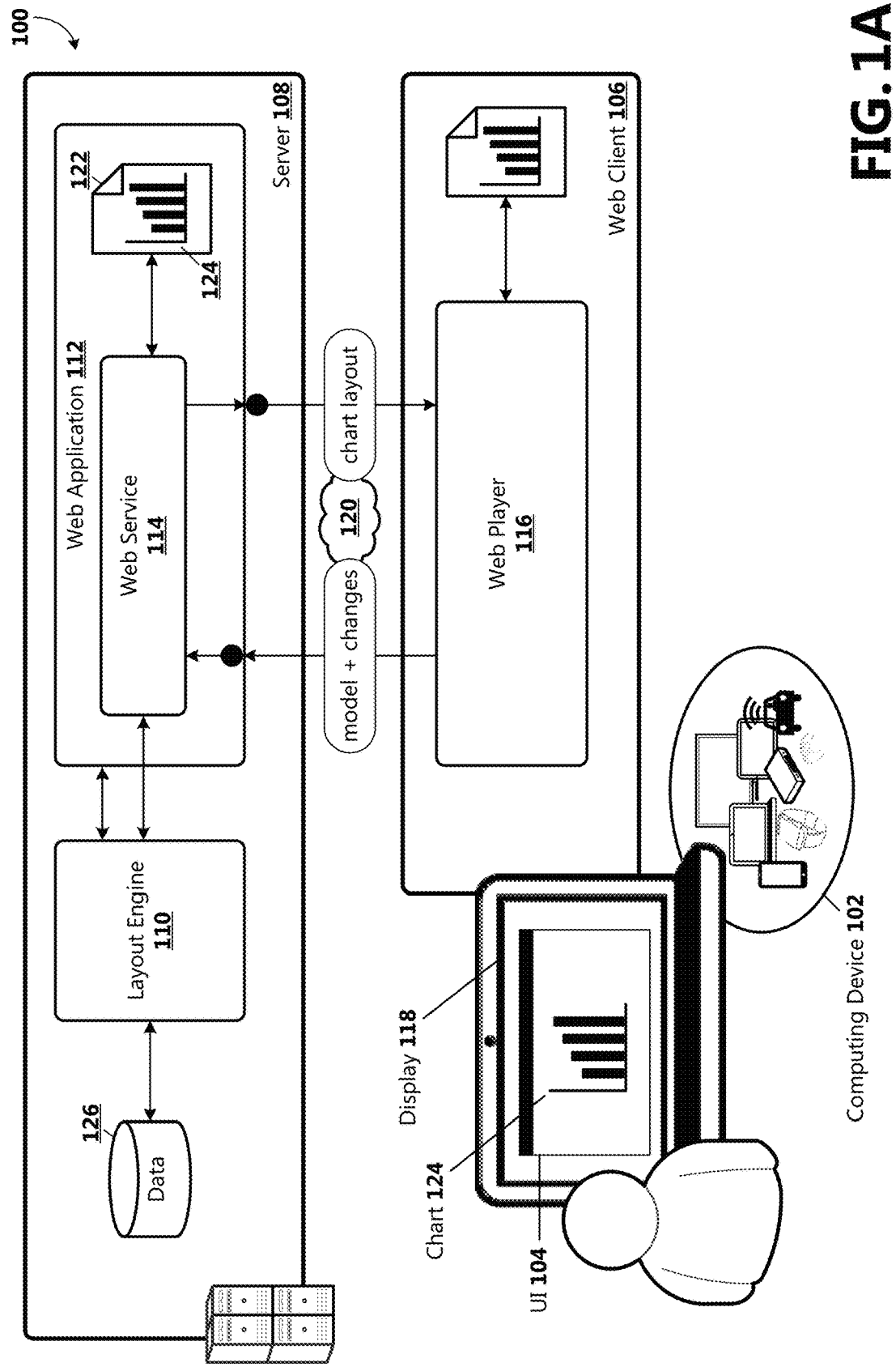
FIG. 1A is a block diagram showing an example operating environment including components of a system for generating a scene graph in a stateful scenario.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Figure 1B:
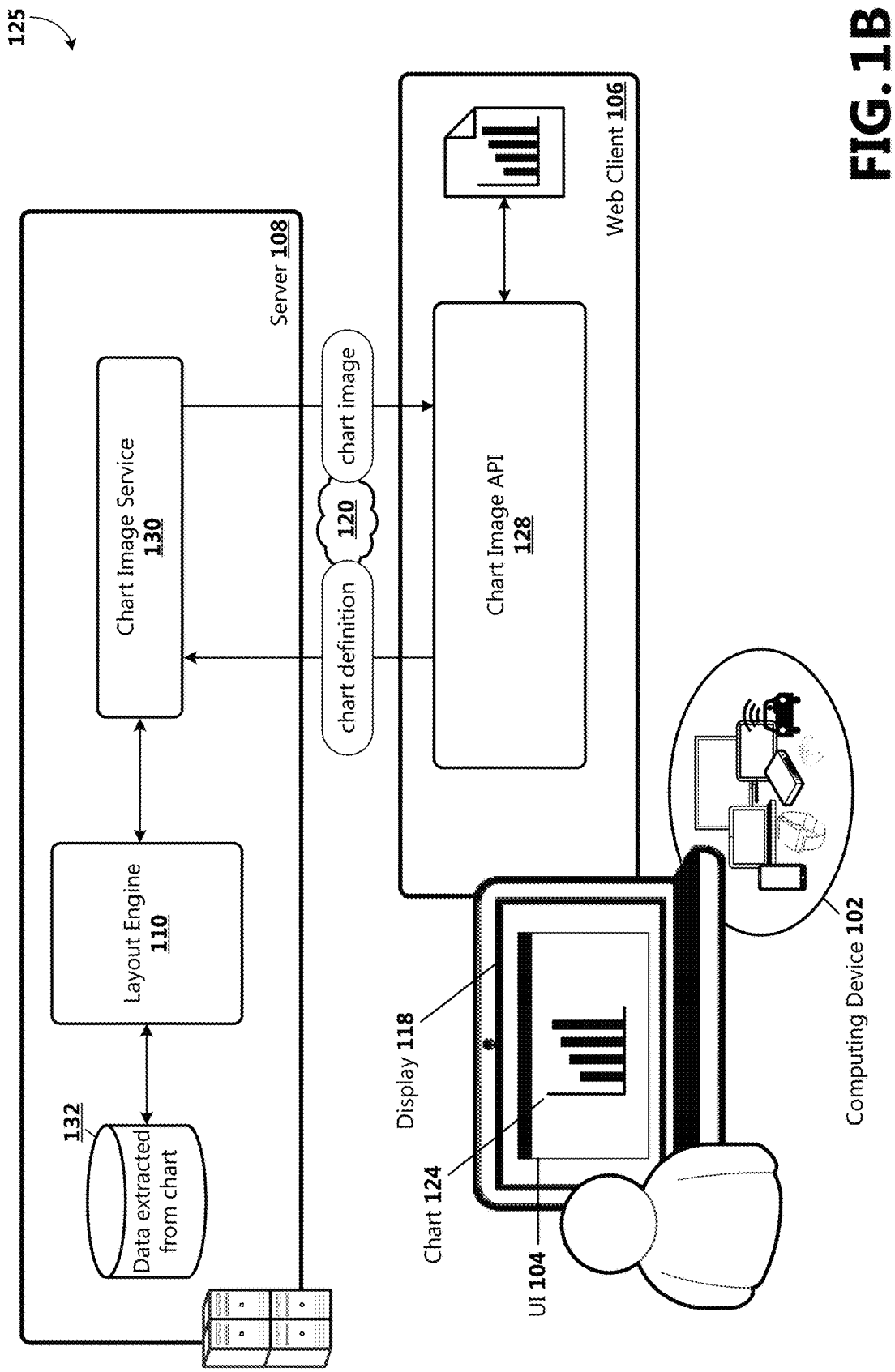
FIG. 1B is a block diagram showing an example operating environment including components of a system for generating a scene graph in a stateless scenario.

Aspects of the present disclosure are directed to a method, system, and computer storage medium for generating a chart-type agnostic data structure for defining a chart for use in chart rendering, animation, interactivity, and accessibility in a web client. Aspects of a charting system are operative to represent output of a server-side chart layout engine in a data structure that can transmitted to and consumed by the web client for rendering an interactive chart, thus allowing for chart layout and chart rendering to exist separately. Further, aspects of the charting system allow for the chart layout code to remain on the server, preventing exposure of the chart layout code externally where it can be stolen. FIG. 1A includes a block diagram of an example operating environment 100 illustrating aspects of an example system for providing server-side chart layout for interactive web-based charts 124. The example operating environment 100 illustrated in FIG. 1A enables stateful session scenarios, for example, where layout is performed for a chart 124 included in a web-based document content file 122. An example operating environment 125 that enables stateless session scenarios is illustrated in FIG. 1B and will be described below.

With reference to FIG. 1A, the example operating environment 100 includes at least one server 108 and at least one client computing device 102. The at least one server 108 includes a layout engine 110 and a web application 112. The web application 112 is hosted on a web application server, which is communicated over a computer network 120 and accessed through a user agent executing on the client computing device 102. In various examples, the user agent is a web client 106, such as a web browser, that displays a web page. For example, a client user interface 104 is generated by the web application 112 and outputted by the web client 106 onto a display 118 associated with the client computing device 102. The client user interface 104 allows a user to interact with application functionality and electronic content. In various examples, the client user interface 104 includes a toolbar comprising various tools and settings related to authoring the content, and a content region display area, in which a copy of at least a portion of a content authoring canvas of a document content file 122 is displayed.

The client computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications for performing a variety of tasks. The hardware of these computing devices is discussed in greater detail in regard to FIGS. 5, 6A, 6B, and 7.

A user may utilize a web application 112 for a variety of tasks, which may include, for example, to write, calculate, draw, take and organize notes, organize, prepare presentations, send and receive electronic mail, make music, and the like. Examples of suitable web applications 112 include, but are not limited to, word processing applications, spreadsheet applications, slide presentation applications, electronic mail applications, drawing applications, note-taking applications, web browser applications, and game applications. Other types of web applications 112 are possible and are within the scope of the disclosure. According to examples, the user is enabled to utilize the web application 112 and web client 106 to create, view, or interact with a chart 124.

As illustrated, the layout engine 110 resides on the server 108, and is operative to generate a set of drawing instructions for a chart 124 for use in rendering, animation, interactivity, and accessibility. For example, in a stateful scenario, a user may open a web-based document content file 122 using a web application 112, wherein the document includes a chart 124. To display an interactive version of the chart 124 (e.g., not a static image of the chart 124), a client-based web player 116 is initiated that is operative to request a set of instructions for drawing a referenced chart 124. The number of web players 116 that are built may be determined by policies of the web application 112. For example, the web application 112 may create a single web player 116, a web player for each chart 124 on a displayed document page, for each chart in a document content file 122 up to a predetermined maximum number of players, etc. In some examples, when a web-based document content file 122 including a chart 124 is first opened, the web application 112 may initially display an image of the chart 124. Upon receiving an indication of an interaction with the displayed image of the chart 124, the web application 112 may then create a web player 116. According to an aspect, the web player 116 runs in the web client 106, and is operative to communicate with the server 108 for requesting a layout to be produced for the chart 124, and to receive a set of drawing instructions for exposing an interactive version of the chart 124 within the client 106. In examples, the web player 116 is a JavaScript component that communicates with a web service 114 that runs in process with the web application 112.

The web service 114 runs on the server 108 and is operative to receive a request for a chart layout from the web player 116, pull the chart definition from the document content file 122, and invoke the layout engine 110 with the chart definition for requesting a layout of the chart 124. According to examples, the chart definition includes information about the type of chart to display, a series of data points (data set 126) that are to be charted, and properties on the chart (e.g., titles, legends, labels, colors). The layout engine 110 is operative to run the layout for the chart 124 on the server 108, and generate a set of drawing instructions embodied as a scene graph, which can be transmitted to other endpoints. For example, the scene graph is communicated with the web player 116 via the web service 114, enabling the web player 116 to draw the chart 124.

As described, the layout engine 110 generates a scene graph, which is a collection of nodes in a graph or a tree data structure, where the child nodes inherit properties from their parent node. According to an aspect, the scene graph is agnostic of the chart type. For example, the types of nodes in the scene graph are generic across all types of charts, and can be used to build any type of chart. By enabling layout to occur on the server 108, the work of layout is avoided by the web player 116, and allows the player to remain lightweight. For example, the web player 116 does not need to know how to generate the scene graph, only how to present it.

The node types serve as building blocks upon which all charts can be built. According to an example, a node in the scene graph includes an ID, which gives the node a unique representation. According to another example, a node further includes a type field that describes the type of the node, and specifies what custom data is added to the node. For example, the type is specified from a list of chart element types, such as plot areas, tick labels, axis, series, etc. According to another example, a node further includes a geometry field, wherein the geometry of the node indicates how to render a scene graph element. For example, a scene graph element may be a rendered image of the node (and possibly its children), or a list of graphics operations required to render the node. According to another example, a node further includes a child field that specifies a list of children the scene graph element has. For example, the parent-child relationship is used to inherit properties and relationships, and further defines a rendering order for the chart 124.

According to another example, a node further includes a custom data field that specifies properties unique to the scene graph element and provides a mapping back to the received chart description. For example, a particular node may describe a series graph data point. The custom data may provide a reference back to the underlying data that the graph data point represents. Accordingly, when the chart 124 is drawn and displayed in the web client 106, the user may interact with the data point or a series including the data point. For example, the user may hover over the series graph data point, and the mapping can be used to provide tool tips over the data point, highlight a selected series, or understand which elements to remove when deselecting a series. Further, when changes to an underlying chart 124 necessitate a new scene graph to be generated, the mapping enables two separate scene graphs to be compared, and enables animating between the two scene graphs. In some examples, accessibility information may be attached to the scene graph in the custom data field, such that accessibility features can be processed and applied by a client-side web player 116 that translates from the scene graph to an output device.

Upon receiving the scene graph, the web service 114 is operative to convert the scene graph to a data format that can be parsed by the web player 116. In one example, the web service 114 converts the scene graph from C++ to JSON (JavaScript Object Notation) format. Further, the web service 114 sends the converted scene graph to the web player 116 for rendering the chart 124. Aspects of the charting system allow for layout and rendering to exist separately, where layout occurs on the server 108 and chart fidelity is maintained across native and browser-based endpoints. Further, according to an aspect, transmission costs of the scene graph are minimized by optimizing the scene graph based on a requested size of the chart 124. That is, the web player 116 is operative to request a specific image size (pixels). The layout engine 110 generating the scene graph can efficiently cull input data point sizes to return geometric operations that operate on the pixel size of the chart 124.

According to some examples, a data set 126 for a chart 124 can be large and/or unbounded. If layout were to occur locally, the data set 126 would need to be downloaded to the client computing device 102. As can be appreciated, downloading a large or unbounded data set 126 to the web client 106 is time-consuming, and would consume vast amounts of memory and processing resources. By performing layout of the chart 124 on the server 108, the client-side web player 116 is enabled to maintain a fixed cost even as charting features are added or become more complex. Accordingly, fewer processing and memory resources are required by the client computing device 102, enabling faster chart load and render performance.

The web player 116 is further operative to listen for and enable interactions with the chart 124. In examples, the web client 106 is operative to receive input from the user, such as selection of content, text input, drawing input, inking input, etc., via various input methods, such as those relying on mice, keyboards, and remote controls, as well as Natural User Interface (NUI) methods, which enable a user to interact with a device in a "natural" manner, such as via speech recognition, touch and stylus recognition, gesture recognition both on screen and adjacent to the screen, air gestures, head and eye tracking, voice and speech, vision, touch, hover, gestures, and machine intelligence. For example, the user may wish to navigate the view of the chart 124, such as via panning or zooming, may hover over a chart element and expect to see highlighting or data tooltips, may wish to resize the chart 124 or certain elements in the chart, may wish to utilize forecasting functionality, may wish to utilize graphical goal seek functionality to modify underlying chart data via dragging a data point, etc.

In some examples, certain interactive scenarios (e.g., mouse drag, pinch zoom) can be implemented in the UI layer by the web player 116. In other examples, the user may interact with or edit the chart 124, and a new layout is needed. The web player 116 is operative to send changes based on the user's interaction(s) to the web service 114 and request an update to the chart model and a new layout for the chart 124. Accordingly, the web service 114 updates the chart model and invokes the layout engine 110. The layout engine 110 is operative to run the layout for the chart 124, generate an updated scene graph, and communicate the updated scene graph with the web player 116. Upon receiving the updated scene graph, the web service 114 is operative to convert the updated scene graph to a data format that can be parsed by the web player 116, and sends the updated and converted scene graph to the web player 116 for rendering the updated chart 124.

According to an aspect, the web player 116 is further operative to animate between two different scene graphs for providing animation between any two arbitrary chart states. For example, the web player 116 holds a local scene graph that represents the currently rendered state of the chart 124. When a new scene graph is sent to the web player 116 from the server 108, morphing logic is used to transition to the new state. According to an aspect, morphing animations entail interpolating between output states or geometries, not between model states. Utilizing the morphing logic, the web player 116 is operative to align before and after geometries in an initial and a final scene graph (e.g., initial and final key frames) according to semantic IDs encoded in the geometry. For example, as described above, the scene graph includes a mapping back to the chart description (e.g., underlying data that a specific graph data point represents). Accordingly, when changes to an underlying chart 124 necessitate a new scene graph to be generated, the mapping enables two separate scene graphs to be compared, and enables animating between the two scene graphs. The web player 116 is further operative to perform simple geometric transitions of figures and segments, producing an unlimited number of intermediate states (key frames) between any two arbitrary chart states. For example, morphing animation is enabled in a mobile or web environment (e.g., via a web client 106) and provides morphing between changes within a chart or morphing between different chart types (e.g., a bar chart to a pie chart, a scatter chart to a bubble chart). That is, morphing animations are enabled for arbitrary geometries, not only for specific scenarios or for specific chart types. According to an aspect, morphing animations is fast because no layout is required per frame. According to one example, the geometry has a guaranteed bounded cost, thus increasing the probability that a single frame can be rendered at 60 frames per second.

In some examples, the web player 116 is operative to minimize roundtrips to the server 108 and thus reduce network bandwidth usage by locally calculating a next output state to which to animate, and providing temporary feedback to the user until the chart's model is updated by the web service 114 and sent to the web player 116. For example, the web player 116 is operative to predict the interactivity result and provide temporary feedback to the user proximate to the final result. According to an aspect, when the web service 114 sends a scene graph to the web player 116, the web service 114 sends down limited model information embedded in the scene graph, wherein the cost of both the limited model and the scene graph of the chart are guaranteed to be bounded low.

According to an example, the web service 114 sends enough model information to enable the web player 116 to locally handle certain interactivities to avoid server 108 roundtrips during interactivity loops. For example, the web service 114 sends limited model information embedded in the scene graph for enabling interactivity code to produce local temporary feedback to the user proximate to a final result responsive to the user's interaction with the chart 124. That is, the scene graph can have more graphical content than what is currently displayed. For example, an interactivity that shows/hides series objects when hovering over related objects (e.g. legend entries) may require that the scene graph contain multiple series objects even though only one will be displayed at a time. This extra information allows the interactivity to avoid a server call for an updated scene graph. According to another example, data callouts for each data point may be in the initial scene graph but only appear (one at a time) when the mouse hovers over a data point. The web player 116 is operative to hold enough semantic information within view objects to approximate a final result responsive to the user's input. When a chart transition involves producing local temporary feedback based on the state already in the local scene graph cached in the web client 106, the roundtrip cost is zero, and animation can begin without a delay. For example, in a time-series chart, multiple series layouts can be lazy-loaded in the background in preparation for scenarios where the user may interact with a play axis. When a roundtrip is unavoidable (e.g., a new layout for a chart 124 is needed), the web player 116 is operative to provide alternate feedback, such as displaying a bounding box or scaled vectors, to ensure responsiveness while the updated scene graph and view model is being sent from the server 108.

With reference now to FIG. 1B, a block diagram is illustrated that shows an example operating environment 125 that enables stateless session scenarios. For example, in a stateless session scenario, a server-side chart image service 130 is exposed in the web client 106 via a thin wrapper application programming interface, a chart image API 128. According to an aspect, the chart image API 128 is operative to receive a data set 132 and chart information (e.g., selection of a chart type) input by the user via the web client 106, and build a chart definition to send to the chart image service 130 when an image of the chart 124 is requested by the user. In some examples, the web client 106 is enabled to request a specific image size (e.g., pixel size) and format (e.g., bitmap, Scalable Vector Graphics (SVG) geometry).

According to one aspect, the chart image service 130 is stateless in that the web client 106 passes a full chart definition and data set 132 as input via the chart image API 128. According to another aspect, the chart image service 130 may require session states when data include references to a server-side resource. The chart image service 130 is operative to invoke the layout engine 110 with the chart definition and data set 132 for requesting a layout of the chart 124. The chart image service 130 is further operative to receive a scene graph from the layout engine 110, and convert the scene graph to a format that can be drawn in the web client 106. In examples, the scene graph includes semantic information that can be interrogated by the chart image API 128 to produce specific local interactive feedback (e.g., highlighting, tooltip).

Aspects of the chart layout system illustrated in the example operating environment 125 of FIG. 1B are useful to users who may not require fully-interactive charting. For example, such users may have a local data set 132 that they have built and simply want to draw a picture of the data. Further, aspects of the chart layout system illustrated in the example operating environment 125 of FIG. 1B can be used for reducing memory usage in scenarios where an interactive chart 124 is provided via the web player 116 and the chart image service 130 is used for providing an inactive chart. In some examples, some rich rendering effects (e.g., reflections, shadows, 3D bevels) cannot run in a web client 106, but may need to be displayed with full-pixel fidelity. In such cases, the chart image API 128 and chart image service 130 may be utilized to provide a chart 124 with such rendering effects as a draft-quality SVG rendering. Further, the chart image API 128 and chart image service 130 may be utilized via third parties, enabling the third parties to employ quality charting in their web applications.

Figure 2A:
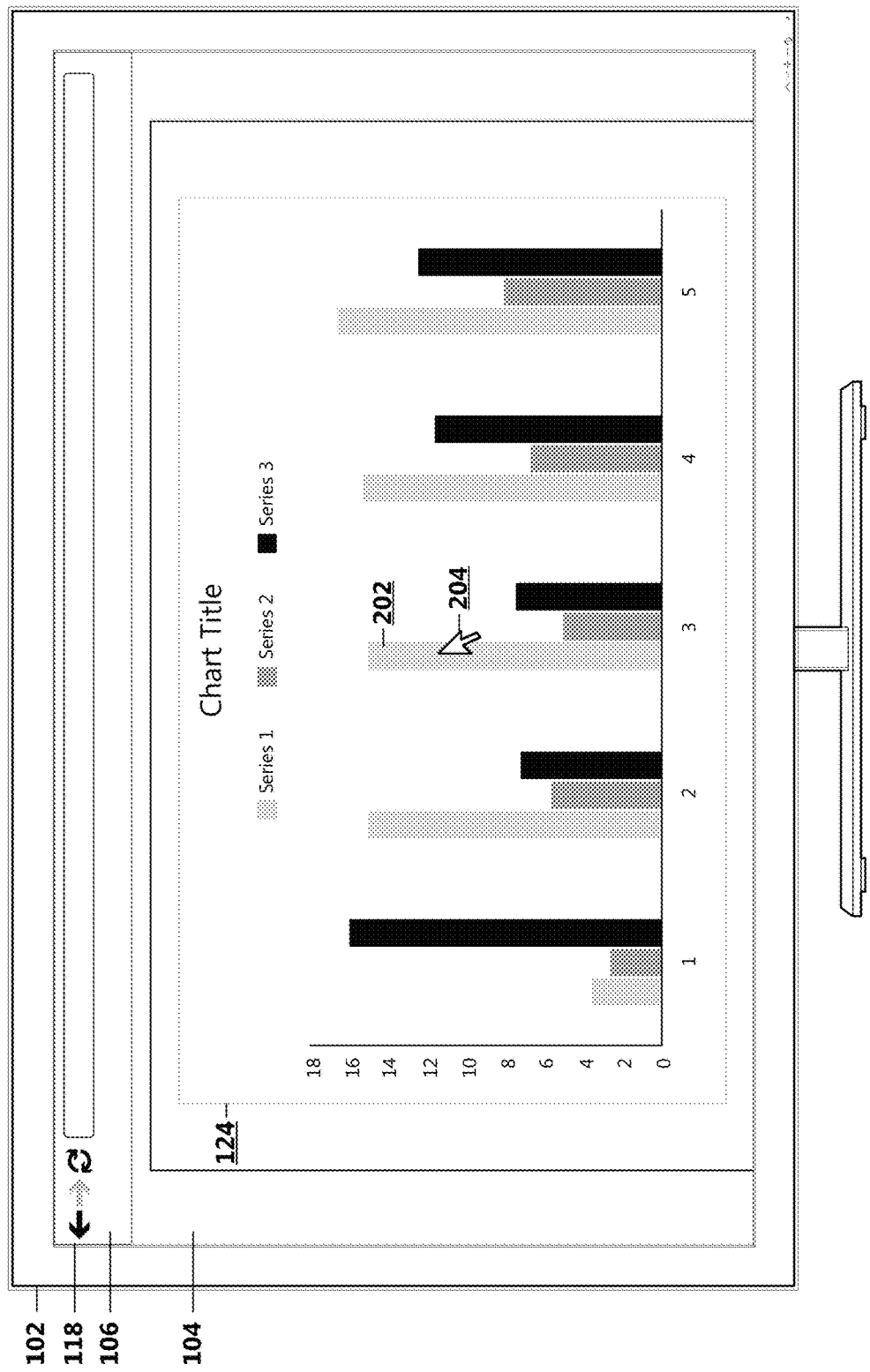
FIG. 2A is an illustration of an example user interface display including a chart, wherein a user is interacting with a chart element.
Figure 2B:
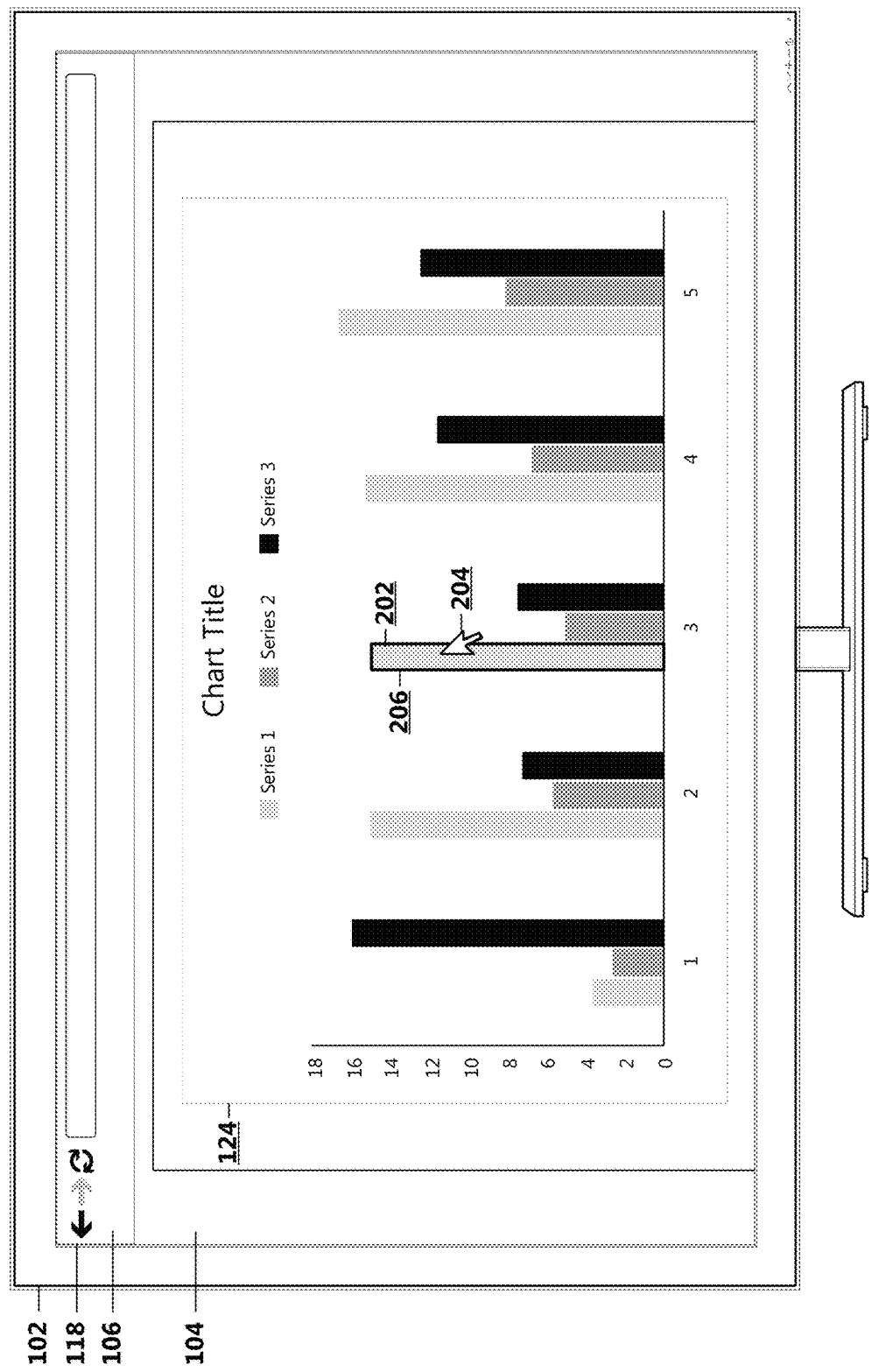
FIG. 2B is an illustration of the example user interface display in FIG. 2A showing locally-provided feedback.

With reference now to FIG. 2A, an example scenario is illustrated, where the scene graph includes enough semantic information to update the display of a chart 124 based on a user interaction, and a server roundtrip is not required. For example, hover highlighting is provided local to the web client 106. As illustrated, a bar chart 124 is shown displayed on the display 118 of a client computing device 102, and the user has moved a mouse pointer 204 on a chart object representing a data point, which is embodied as a bar 202 in the illustrated example. According to an aspect, the geometry cached within the scene graph is annotated with escapes that describe the data context of each figure and segment. Upon receiving an indication of the user's mouse pointer hovering over the bar 202, the data context is extracted during hit-testing and used to filter out unrelated geometry. With reference now to FIG. 2B, highlighting 206 is displayed around the bar 202 beneath the mouse pointer to invite the user to interact with it, for example, to advertise that the data point can be clicked to cross-filter on another chart, or to draw a vertical line from the y value to the category axis.

Figure 3A:
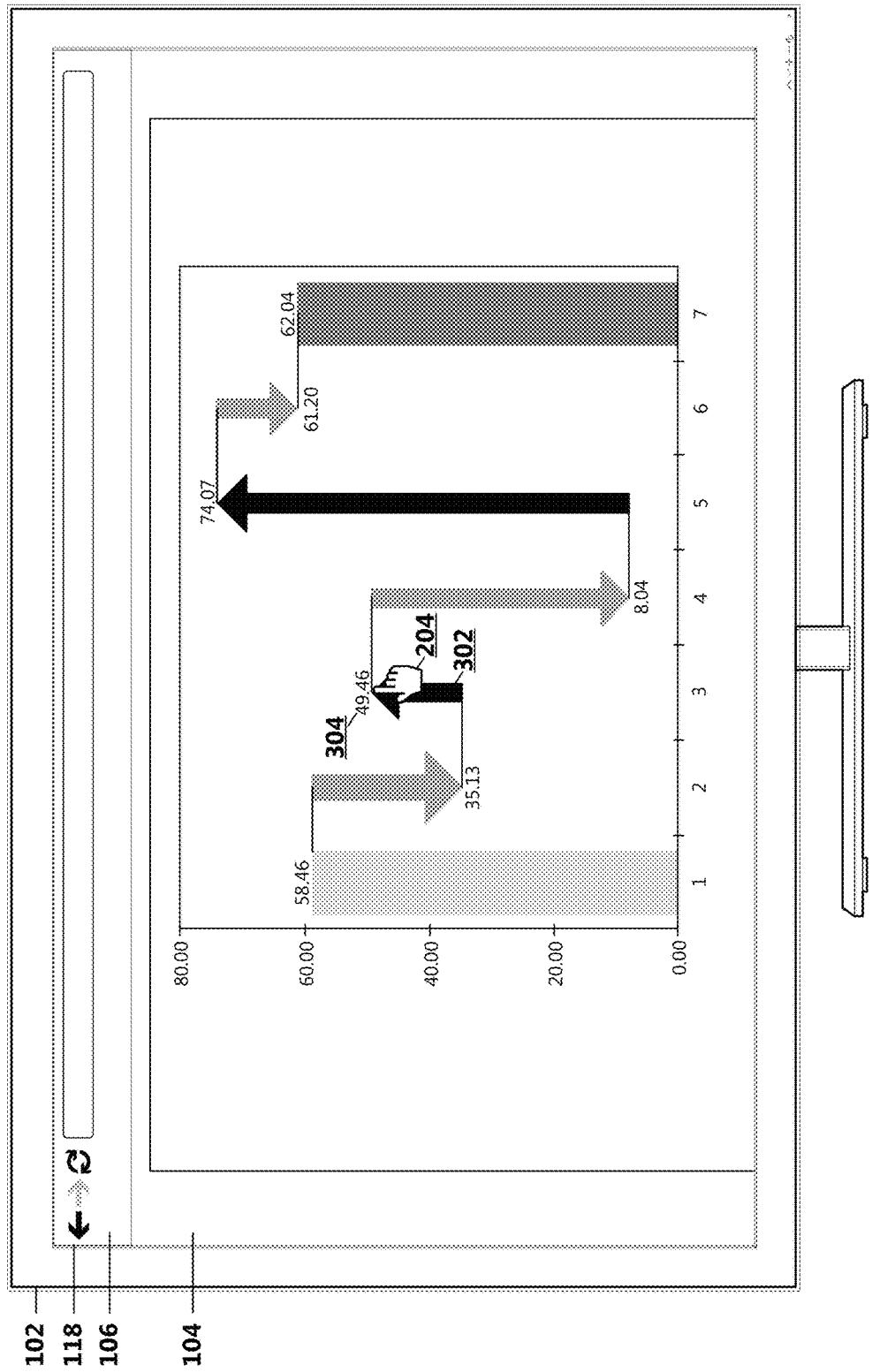
FIG. 3A is an illustration of an example user interface display of a chart, wherein a user is interacting with a chart element.

With reference now to FIG. 3A, an example scenario is illustrated where the web player 116 utilizes semantic information in the local scene graph to update the display of the chart 124 with feedback proximate to the final result based on the interaction, and sends an updated chart definition and a request for chart layout to the web service 114. As illustrated, a column chart 124 is shown displayed on the display 118 of the client computing device 102, and the user has moved a mouse pointer 204 onto a data point 302. According to an aspect, the scene graph held in the web client 106 comprises per-figure and per-segment annotations that point to the data point index as well as points of interest, such as where the data value 304 is reflected (e.g. the top edge of a column in a column chart). This information is returned via hit-testing and can be used to advertise where to click (via mouse cursor or highlighting) and trigger a drag loop. For example, via graphical goal seek functionality, the user is enabled to modify underlying chart data via dragging data point geometry. This can be used to see how a change would affect forecasted data.

Figure 3B:
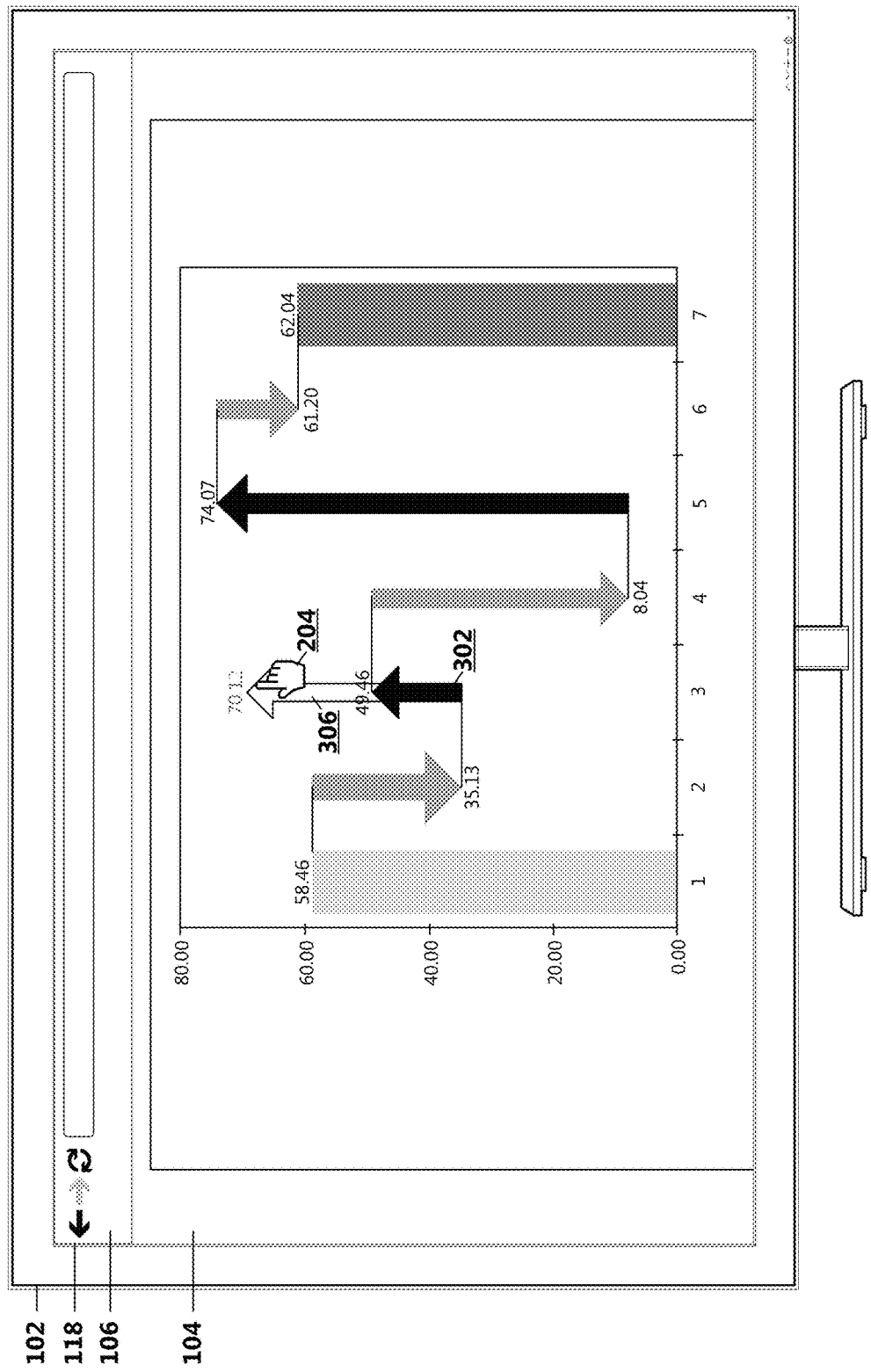
FIG. 3B is an illustration of the example user interface display in FIG. 3A showing locally-provided temporary feedback.

With reference now to FIG. 3B, upon starting a drag operation, a drag image 306 is built. In some examples, the drag image 306 is the full data point geometry (e.g. a bubble on a bubble chart). In other examples, the drag image 306 includes vectors defining the edge of the data point 302 where the value 304 is reflected (e.g. the pointed edge of an arrow). According to an aspect, minimal computing resources are utilized to generate the drag image 306 because annotations surround the data point geometry 302 and can be used to filter out unimportant data. For each drag delta, the web player 116 sends a command that passes the movement delta (local inches) to the web service 114, and the web service 114 updates the chart model and triggers layout via the layout engine 110. For example, the web service 114 applies the delta to the existing data point's visual position to determine the new location within its coordinate space. The coordinate space (an internal model concept) projects the new location onto the axes to determine the raw dimensional values (x/y/r). The new data value is then updated, triggering chart layout, and the web player 116 updates its scene graph while still in the drag loop.

Figure 4:
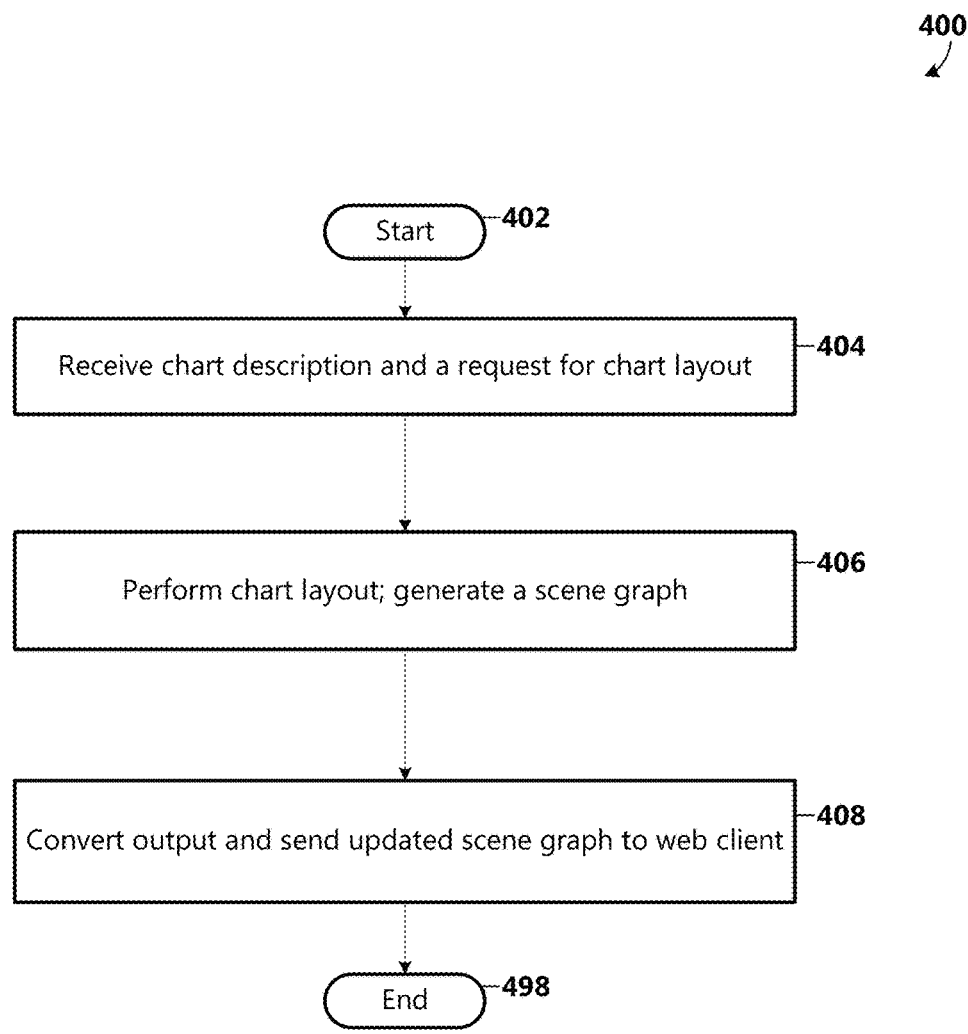
FIG. 4 is a flow chart showing general stages involved in an example method for providing generation and transmission of a chart-type agnostic data structure for defining a chart for use via a web client.

Having described example operating environments 100, 125 with respect to FIGS. 1A and 1B and example interaction scenarios with respect to FIGS. 2A-3B, FIG. 4 illustrates a flow chart showing general stages involved in an example method 400 for generating and transmitting a scene graph. With reference now to FIG. 4, the method 400 begins at a start OPERATION 402, and proceeds to OPERATION 404, where a chart definition for a chart 124 to be rendered via a web client 106 is passed to the layout engine 110 for chart layout. For example, a determination may be made to display the chart 124 as a dynamic chart that enables user interaction, and thus necessitates chart layout. In some examples, OPERATION 402 occurs when a document content file 122 comprising the chart 124 is opened. In other examples, OPERATION 402 occurs based on a user-interaction, such as hovering over or clicking on the displayed chart image. In other examples, OPERATION 402 occurs based on whether the chart image is currently displayed in the UI 104. Other factors for determining to run chart layout are possible and are within the scope of aspects of the present disclosure. In a stateful scenario, the web service 114 pulls the chart definition from the document content file 122, stores a copy of the chart definition, and passes the chart definition to the layout engine 110 for chart layout. In a stateless scenario, the chart image service 130 receives the chart definition from the web client 106 via the chart image API 128.

The method 400 proceeds to OPERATION 406, where the layout engine 110 performs chart layout, and generates a scene graph. As described above, the scene graph is a collection of nodes in a graph or a tree data structure, where the child nodes inherit properties from their parent node. According to an aspect, the scene graph is agnostic of the chart type. For example, the types of nodes in the scene graph are generic across all types of charts, and can be used to build any type of chart.

At OPERATION 408, the layout engine 110 passes the scene graph to the web service 114, and the web service 114 converts the scene graph to a format that can be parsed by the web client 106 (e.g., C++ to JSON), embeds limited model information in the scene graph, and sends the scene graph to the web player 116 for drawing the chart 124 on the display 118 of the client computing device 102. According to an example, the scene graph includes enough semantic information to enable the web player 116 to handle certain interactions with the chart 124 locally, locally provide animation between scene graph updates with the chart 124 locally, and locally apply certain accessibility features. The method 200 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
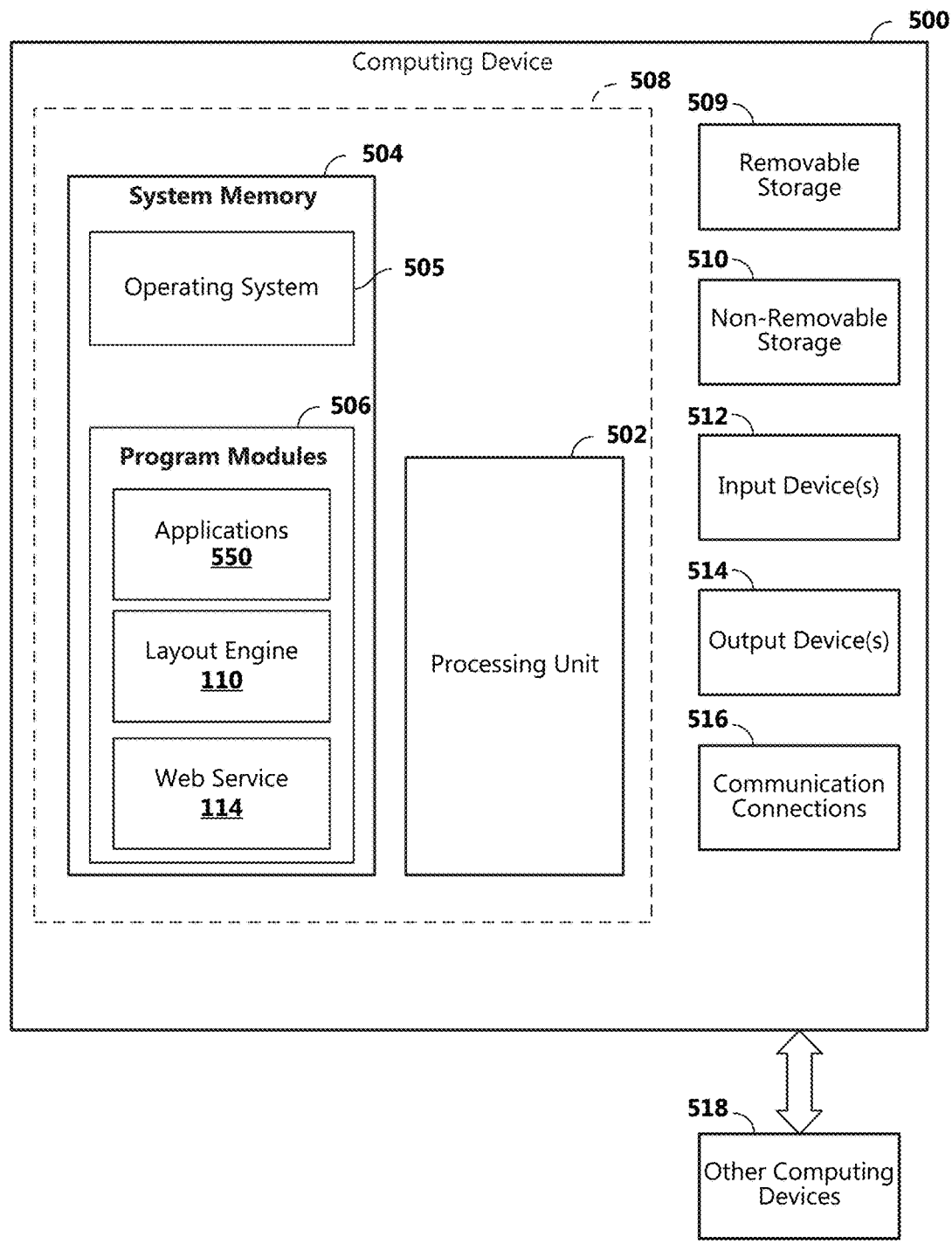
FIG. 5 is a block diagram illustrating example physical components of a computing device.
Figure 6A:
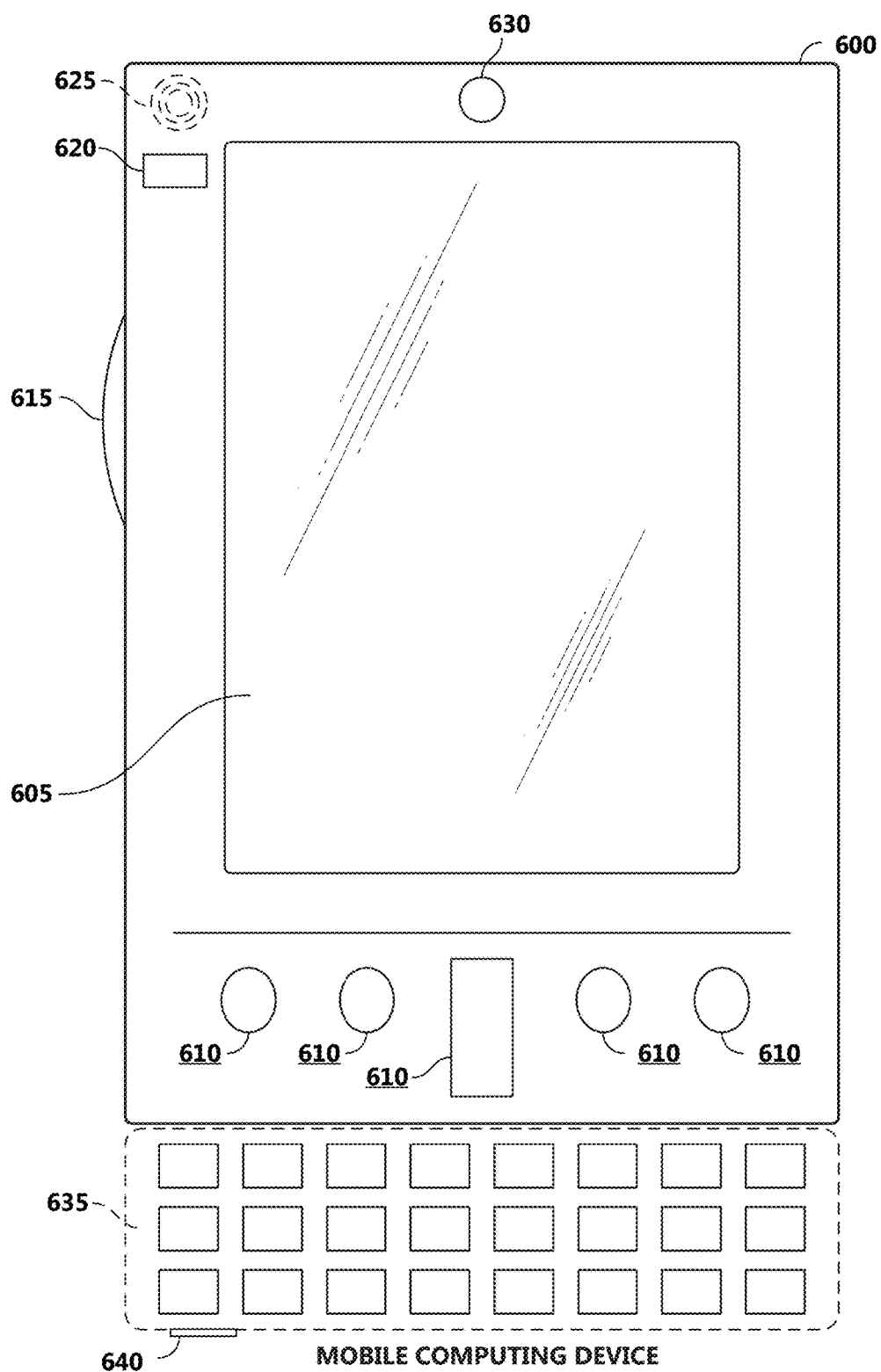
FIGS. 6A and 6B are simplified block diagrams of a mobile computing device.
Figure 6B:
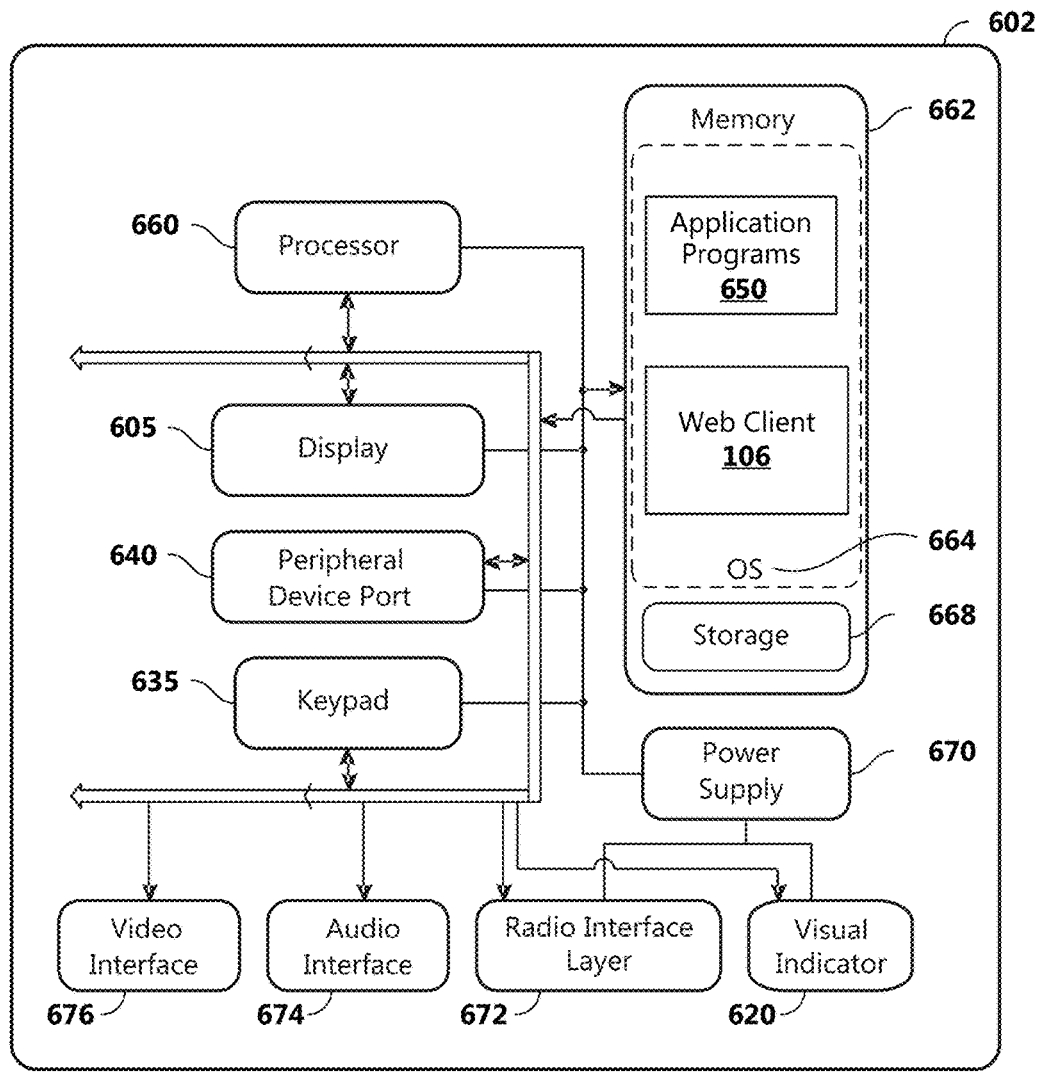
Figure 7:
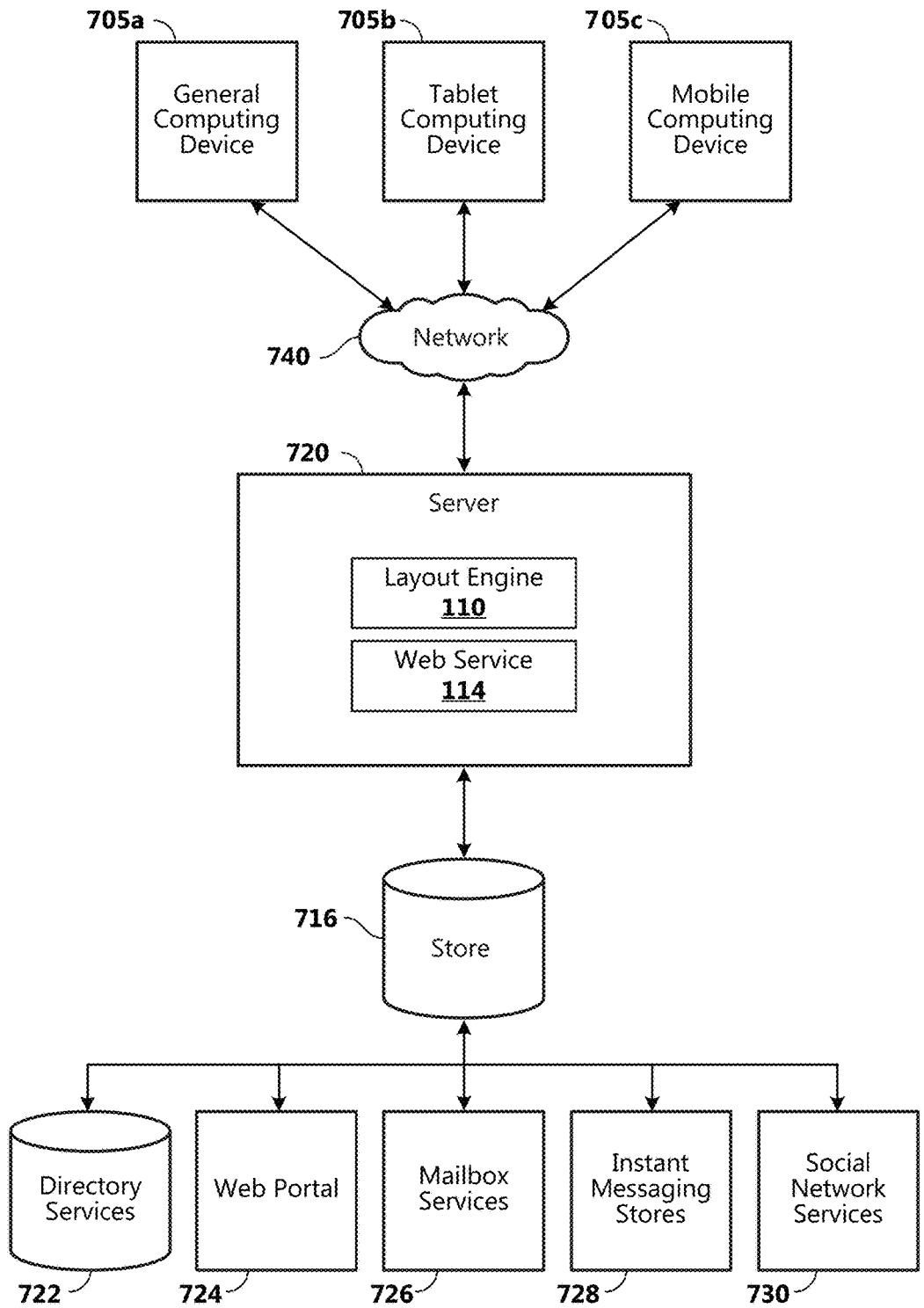
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the layout engine 110 and the web service 114. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., the layout engine 110 and the web service 114) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., web browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the web client 106 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for generating a scene graph as described above. Content developed, interacted with, or edited in association with the layout engine 110 and the web service 114 is enabled to be stored in different communication channels or other storage types. For example, various documents may be stored using a directory service 722, a web portal 724, a mailbox service 726, an instant messaging store 728, or a social networking site 730. The layout engine 110 and the web service 114 are operative to use any of these types of systems or the like for generating a scene graph, as described herein. According to an aspect, a server 720 provides the layout engine 110 and the web service 114 to clients 705*a,b,c*. As one example, the server 720 is a web server providing the layout engine 110 and the web service 114 over the web. The server 720 provides the layout engine 110 and the web service 114 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for defining how to render a chart, comprising:
   performing a chart layout for a chart based on a chart description;
   generating a scene graph defining the layout of the chart, wherein the scene graph is agnostic of a chart-type, wherein generating the scene graph includes:
      providing a mapping, with the scene graph, to a web client, wherein the mapping comprises a data field for each scene graph point that indicates to which point in a chart description, received from the web client, the scene graph point is associated, wherein the mapping is read by the web client and enables the web client to compare two separate scene graphs and identify the common scene graph points by the data field, and wherein the web client locally animates changes between common scene graph points without needing other scene graphs be generated to represent the changes between scene graph points;
   converting the scene graph from a first format to a second format, wherein the second format is consumable by the web client; and
   transmitting the converted scene graph to the web client for rendering the chart, thereby providing an interactive chart via the web client that does not expose chart layout code.

2. The computer-implemented method of claim 1, wherein generating the scene graph comprises:
   generating a collection of nodes, each node representing a chart element; and
   specifying a node type for each node, the node type defining a chart element type.

3. The computer-implemented method of claim 2, wherein specifying the node type for each node comprises selecting the node type from a list of chart element types including:
   a series;
   a chart area;
   a plot area;
   a title;
   an axis label;
   an axis title;
   a legend;
   grid lines;
   tick marks; and
   a data point label.

4. The computer-implemented method of claim 2, wherein generating the scene graph comprises specifying geometry for each node, the geometry indicating how to render the associated chart element.

5. The computer-implemented method of claim 4, wherein specifying geometry for each node comprises specifying to render an image of the node.

6. The computer-implemented method of claim 4, wherein specifying geometry for each node comprises specifying a list of graphics operations for rendering the node.

7. The computer-implemented method of claim 2, wherein generating the scene graph comprises specifying a list of children nodes the associated chart element has, wherein a child node inherits properties from its parent node, and wherein specification of a parent-child relationship defines a rendering order for the chart.

8. The computer-implemented method of claim 2, wherein generating the scene graph comprises adding custom data to a node, the custom data providing the mapping to the chart description and to data that the associated chart element represents.

9. The computer-implemented method of claim 8, wherein a type of node in the scene graph is generic across at least two types of charts, and wherein the type of node builds one of two or more types of charts.

10. The computer-implemented method of claim 8, wherein the semantic information includes data that represents the specific graph data point.

11. The computer-implemented method of claim 8, wherein providing the mapping to the chart description enables the web client also to locally provide accessibility functionalities.

12. The computer-implemented method of claim 1, wherein converting the scene graph from the first format to the second format comprises converting the scene graph from a C++ data structure to a JavaScript Object Notation (JSON) data structure.

13. The computer-implemented method of claim 1, wherein generating a scene graph comprises optimizing the scene graph based on a requested size of the chart included in the chart description, wherein optimizing the scene graph comprises culling data points or figures and segments within data point geometry to return geometric operations that operate on a pixel size of the chart.

14. The computer-implemented method of claim 1, wherein prior to performing the chart layout for the chart based on the chart description, receiving the chart description defining the chart to be rendered via the web client.

15. A system for defining how to render a chart, the system including a computing device comprising:
   at least one processing device; and
   at least one computer readable data storage device storing instructions that, when executed by the at least one processing device, cause the computing device to:
      perform a chart layout for a chart based on a chart description;
      generate a scene graph defining the layout of the chart, wherein the scene graph is agnostic of a chart-type, wherein generating the scene graph includes:
         providing a mapping, with the scene graph, to a web client, and wherein the mapping comprises a data field for each scene graph point that indicates to which point in a chart description, received from the web client, the scene graph point is associated, wherein the mapping is read by the web client and enables the web client to compare two separate scene graphs and identify the common scene graph points by the data field, and wherein the web client locally animates changes between common scene graph points without needing other scene graphs be generated to represent the changes between scene graph points;
      convert the scene graph from a first format to a second format, wherein the second format is consumable by the web client; and transmit the converted scene graph to the web client for rendering the chart, thereby providing an interactive chart via the web client that does not expose chart layout code.

16. The system of claim 15, wherein:

the scene graph defines a rendering order for the chart and comprises a collection of nodes, each node representing a chart element; and wherein in generating the scene graph, the system is operative to specify a node type for each node, the node type defining an associated chart element type selected from a list of chart element types including:

a series;
a chart area;
a plot area;
a title;
an axis label;
an axis title;
a legend;
grid lines;
tick marks; and
a data point label.

17. The system of claim 15, wherein in generating the scene graph, the system is operative to specify geometry indicating how to render the associated chart element, the geometry specifying:

to render an image of the node; or
a list of graphics operations for rendering the node.

18. The system of claim 15, wherein the scene graph includes custom data associated with a node, the custom data providing the mapping to the chart description and to data that the associated chart element represents, wherein the mapping also enables the web client to:

locally provide accessibility functionalities.

19. The system of claim 15, wherein in converting the scene graph from the first format to the second format, the system is operative to convert the scene graph from a C++ data structure to a JavaScript Object Notation (JSON) data structure.

20. A computer readable storage device including computer readable instructions, which when executed by a processing unit is operative to:

receive a chart description for a chart to be rendered via a web client;

perform a chart layout for the chart based on the chart description;

generate a scene graph defining the layout of the chart, wherein the scene graph is agnostic of a chart-type, defines a rendering order for the chart, and comprises a collection of nodes, each node representing a chart element, wherein generating the scene graph includes:

providing a mapping, with the scene graph, to a web client, and wherein the mapping comprises a data field for each scene graph point that indicates to which point in a chart description, received from the web client, the scene graph point is associated, wherein the mapping is read by the web client and enables the web client to compare two separate scene graphs and identify the common scene graph points by the data field, and wherein the web client locally animates changes between common scene graph points without needing other scene graphs be generated to represent the changes between scene graph points;

convert the scene graph from a C++ data structure to a JavaScript Object Notation (JSON) data structure, wherein the JSON data structure is consumable by the web client; and transmit the converted scene graph to the web client for rendering the chart, thereby providing an interactive chart via the web client that does not expose chart layout code.

* * * * *